(No Model.)  14 Sheets—Sheet 1.

E. A. FRANKLIN.
CARTRIDGE LOADING MACHINE.

No. 396,358.  Patented Jan. 15, 1889.

Fig. 1.

WITNESSES:
C. M. Clarke.
N. B. Corwin

INVENTOR,
Edward A. Franklin
by N. Bakewell Sons
his Att'ys (No Model.)
14 Sheets—Sheet 3.

E. A. FRANKLIN.
CARTRIDGE LOADING MACHINE.

No. 396,358. Patented Jan. 15, 1889.

WITNESSES:
C. M. Clarke.
N. T. Corwin

INVENTOR,
Edward A. Franklin
by W. Bakewell & Sons
his Att'ys (No Model.)  14 Sheets—Sheet 4.

E. A. FRANKLIN.
CARTRIDGE LOADING MACHINE.

No. 396,358. Patented Jan. 15, 1889.

(No Model.) 14 Sheets—Sheet 5.
E. A. FRANKLIN.
CARTRIDGE LOADING MACHINE.

No. 396,358. Patented Jan. 15, 1889.

Fig. 5.

WITNESSES:

INVENTOR,

Edward A. Franklin
by F. Bakewell & Son
his Att'y.

(No Model.) 14 Sheets—Sheet 7.

E. A. FRANKLIN.
CARTRIDGE LOADING MACHINE.

No. 396,358. Patented Jan. 15, 1889.

WITNESSES:
C. M. Clarke
W. B. Corwin

INVENTOR,
Edward A. Franklin
by Th. Bakewell & Son
his Att'ys.

(No Model.) 14 Sheets—Sheet 8.

E. A. FRANKLIN.
CARTRIDGE LOADING MACHINE.

No. 396,358. Patented Jan. 15, 1889.

Fig. 16.
Section A.A. on Fig. 12.

Fig. 17.
Section B.B. on Fig. 13.

WITNESSES:
C. M. Clarke
N. B. Corwin

INVENTOR,
Edward A. Franklin
by N. Bakewell & Sons
his Att'ys.

(No Model.)  14 Sheets—Sheet 9.

E. A. FRANKLIN.
CARTRIDGE LOADING MACHINE.

No. 396,358. Patented Jan. 15, 1889.

Fig. 18.

(No Model.) 14 Sheets—Sheet 10.

E. A. FRANKLIN.
CARTRIDGE LOADING MACHINE.

No. 396,358. Patented Jan. 15, 1889.

Fig. 19.

WITNESSES:
R. M. Clarke
W. B. Corwin

INVENTOR,
Edward A. Franklin
by W. Bakewell & Sons
his Att'ys.

(No Model.) 14 Sheets—Sheet 13.

E. A. FRANKLIN.

CARTRIDGE LOADING MACHINE.

No. 396,358. Patented Jan. 15, 1889.

Fig.23.

WITNESSES: INVENTOR,

Edward A. Franklin
by W. Bakewell & Sons
his Att'ys (No Model.) 14 Sheets—Sheet 14.

E. A. FRANKLIN.
CARTRIDGE LOADING MACHINE.

No. 396,358. Patented Jan. 15, 1889.

WITNESSES:
C. M. Clarke
W. B. Corwin

INVENTOR,
Edward A. Franklin
by W. Bakewell Sons
his Att'ys.

UNITED STATES PATENT OFFICE.

EDWARD A. FRANKLIN, OF BRENHAM, TEXAS, ASSIGNOR TO BAILEY FARRELL & CO., OF PITTSBURG, PENNSYLVANIA.

CARTRIDGE-LOADING MACHINE.

SPECIFICATION forming part of Letters Patent No. 396,358, dated January 15, 1889.

Application filed December 12, 1887. Serial No. 257,639. (No model.)

*To all whom it may concern:*

Be it known that I, EDWARD A. FRANKLIN, of Brenham, in the county of Washington and State of Texas, have invented a new and useful Improvement in Machines for Loading Cartridges; and I do hereby declare the following to be a full, clear, and exact description thereof.

My present improved machine is constructed on the same general principle as the machine shown and described in Letters Patent No. 347,268, granted to me on August 10, 1886.

I will now describe my improvement with reference to the accompanying drawings, in which—

Like symbols of reference indicate like parts in each.

Figure 1:
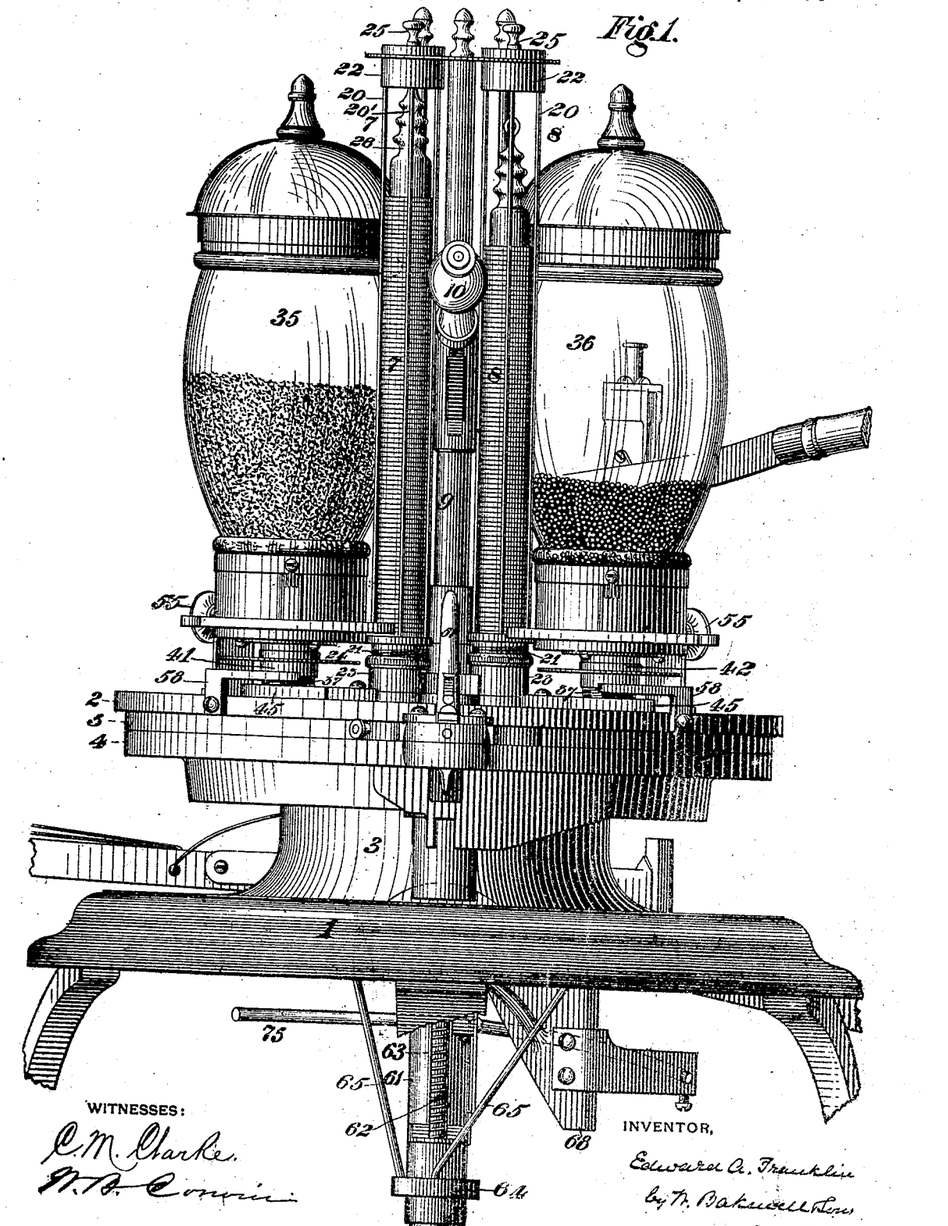
Figure 1, Sheet 1, is a front elevation of my improved cartridge-loading machine.
Figure 2:
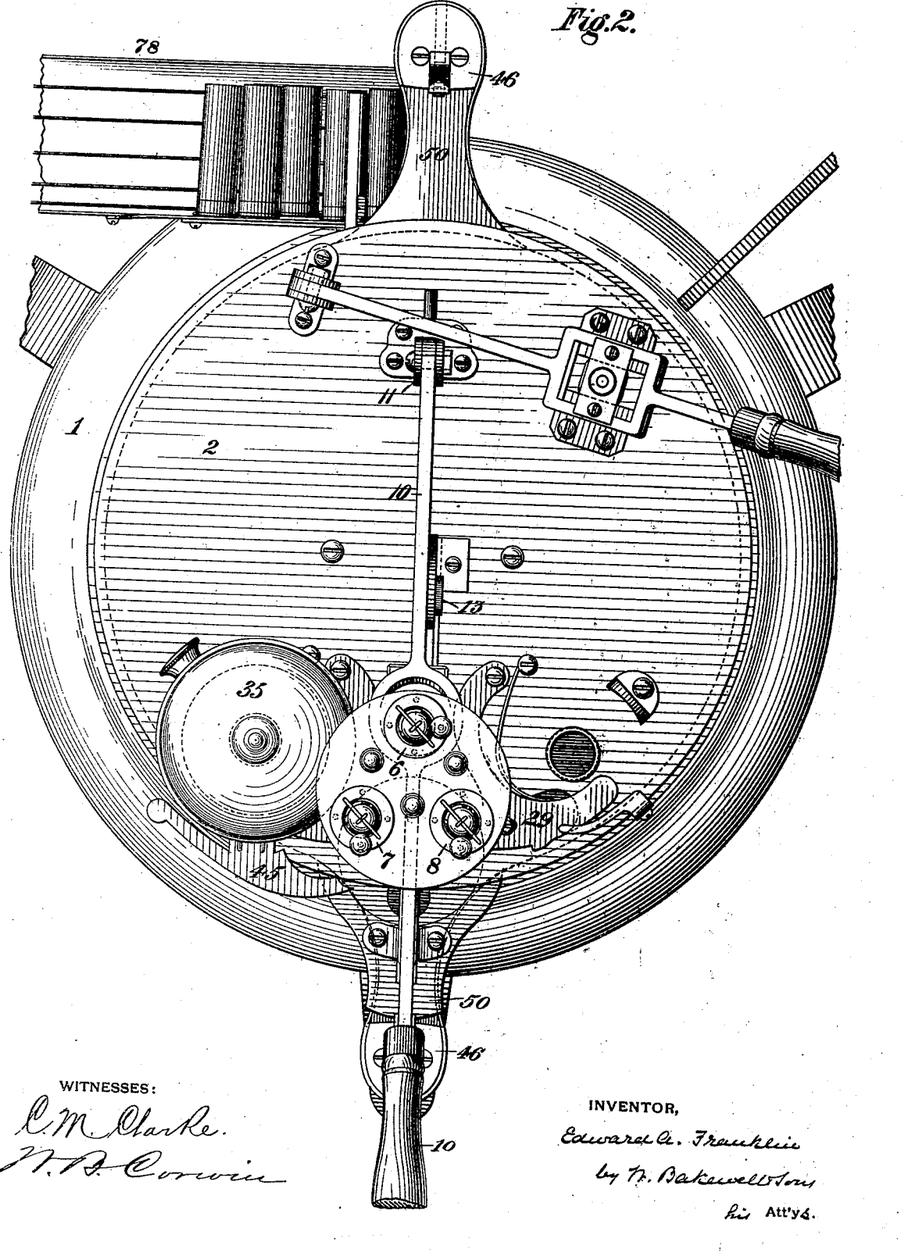
Fig. 2, Sheet 2, is a top plan view, the shot-hopper being removed.
Figure 3:
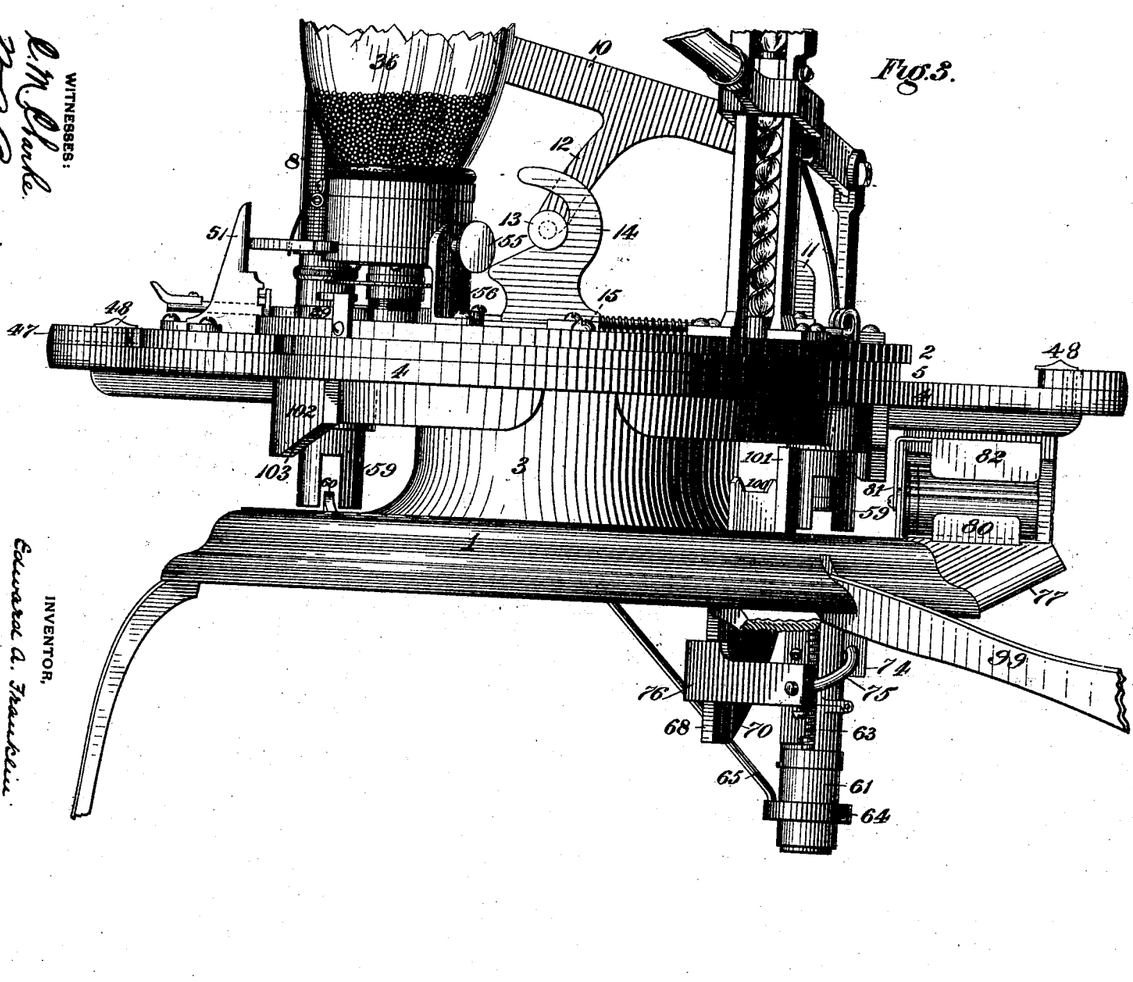
Fig. 3, Sheet 3, is a side elevation, partly broken away.
Figure 4:
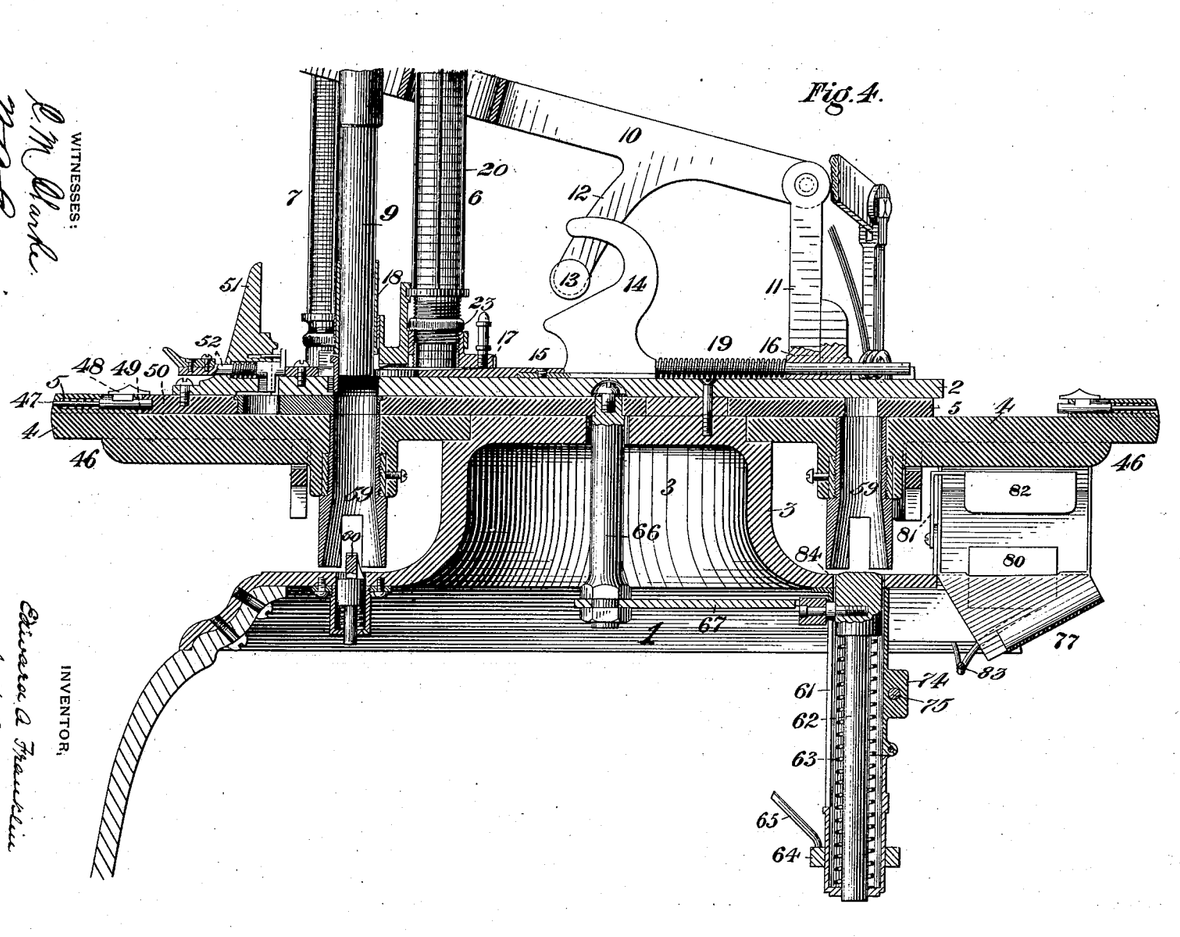
Fig. 4, Sheet 4, is a vertical longitudinal section through the center of the machine.
Figure 12:
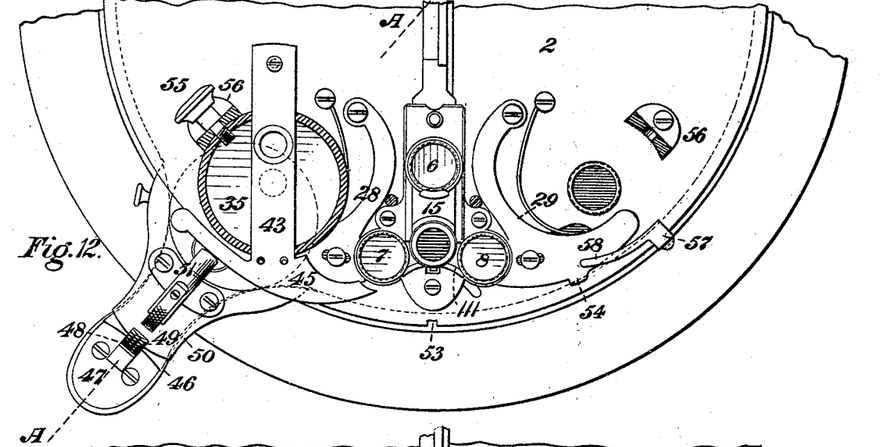
Fig. 12, Sheet 7, is a sectional plan view, partly broken away, showing the charging mechanism.

Mounted on a suitable stand, 1, is a circular bed-plate, 2. The stand 1 has a central circular standard, 3, between the upper end of which and the lower surface of the bed-plate 2 two revoluble plates, 4 and 5, are placed. The lower plate, 4, is capable of making a complete revolution upon the standard 3, while the upper plate, 5, is only capable of making a partial revolution. My present machine differs in respect to the wad-hoppers from my former machine in having three of such hoppers instead of one. They are numbered 6 7 8, Figs. 2 and 12, the hopper 6 being mounted directly back of the plunger 9, by which the shells are charged, Fig. 4, the hopper 7 to the left, and the hopper 8 to the right, Fig. 1, said hoppers all being mounted upon the bed-plate 2. The plunger 9, Figs. 2, 3, and 4, is mounted on a lever, 10, which is pivoted to a standard, 11, situate at the rear side of the bed-plate. The lever 10 is provided with a downwardly-projecting arm, 12, Fig. 3, which has a laterally-projecting pin, 13. This pin engages an incline on the front side of a vertical arm, 14, of a slide, 15, placed on the surface of the bed-plate, Fig. 4. This slide moves in guides 16 17—the former made in the base of the standard 11 and the latter mounted on the bed-plate just in the rear of a tubular guide, 18, through which the plunger 9 works. The wad-hopper 6 is mounted on the top of the guide 17 and delivers its wads through an opening in the top of the guide just in front of the end of the slide 15, so that the latter in its movement shall push the wad into position under the plunger. The slide 15 is projected forward by the action of the spring 19, mounted upon the shank of the slide 15.

Figures 6, 7, 8, 9, 10, 11:
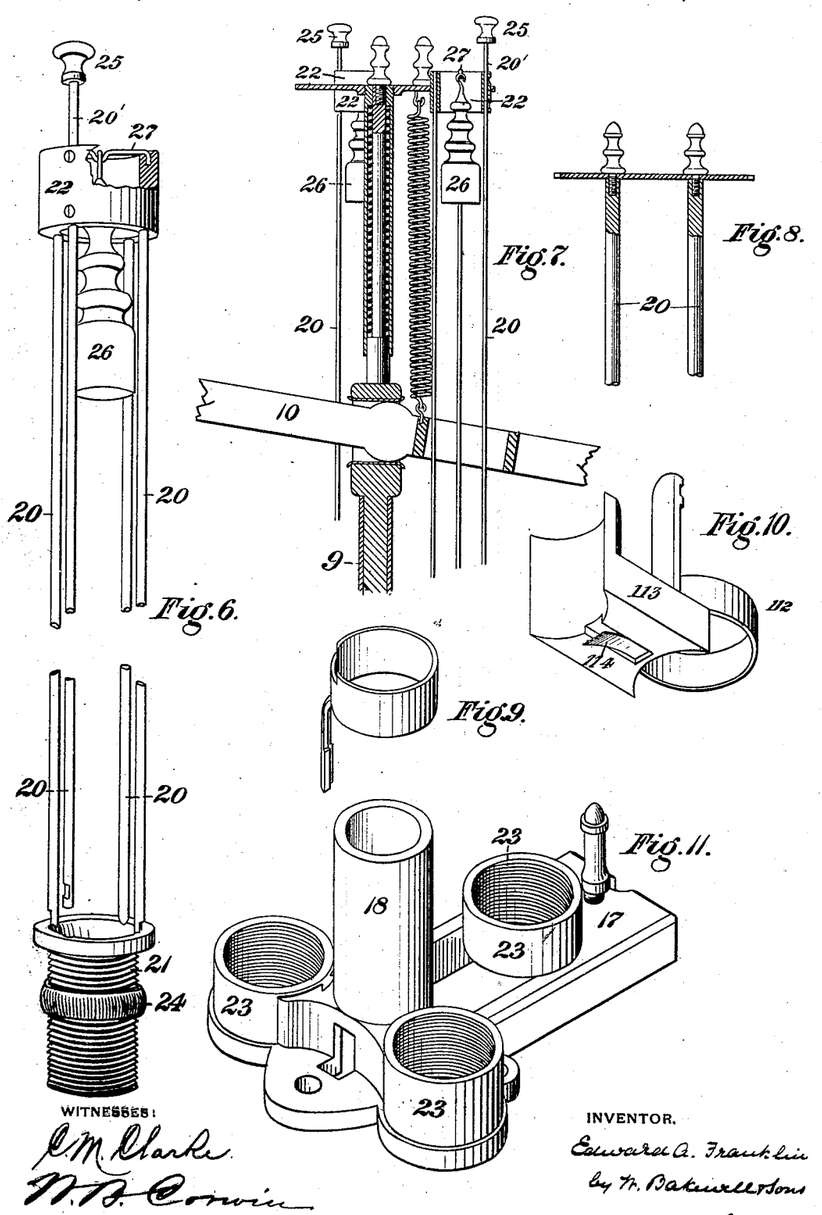
Fig. 6, Sheet 6, is a detached perspective view of one of the wad-holders.
Fig. 7 is a vertical central section of the wad-plunger, showing its connection with the operating-lever 10.
Fig. 8 is a view of the wires 20 of the wad-hoppers.
Fig. 9 is a perspective view of the gage of the wad-hopper.
Fig. 10 is a perspective view of the adjusting device of the wad-hopper.
Fig. 11 is a perspective view of the sockets of the wad-hoppers.

The wad-hoppers 6, 7, and 8 are constructed as follows, (see Sheet 6:) Their bodies are preferably formed of four wires, 20, secured at the lower end to an externally-threaded tube, 21, and at the upper end to a short tube or ring, 22. The tube 21 screws into an internally-threaded socket, 23. The socket 23 of the hopper 6 is secured to the top of the guide 17, and the sockets of the hoppers 7 and 8 are secured to wing-pieces at the base of the tubular guide 18. The purpose of the threaded tubes 21 is to enable the hoppers to be adjusted vertically the proper distance from the surface of the bed-plate upon which the wad slides, so as to make an opening of the proper width to suit the thickness of the wad used in any one of the hoppers. If the distance between the lower end of the hopper and the bed-plate upon which the wad is moved is too wide, there would be danger of the next wad dropping down into the path of the wad-slide and either being forced into the path of the plunger with the first wad or, if the opening is not wide enough for it to go through, acting as a stop and preventing the wad-slide from forcing the first wad through. This adjustment is effected by rotating the hopper upon its axis, and when the proper adjustment is obtained the tube 21 is secured in position by means of a stop-nut, 24, mounted thereon, said nut being screwed down until it comes in contact with the top of the socket 23. One of the wires 20', which form the sides of the hopper, is removable vertically, said wire being provided with the head 25 above the top piece, 22, and the purpose in removing it is to fill the hopper with wads through the open side made by its removal.

Figures 13, 14, 15:
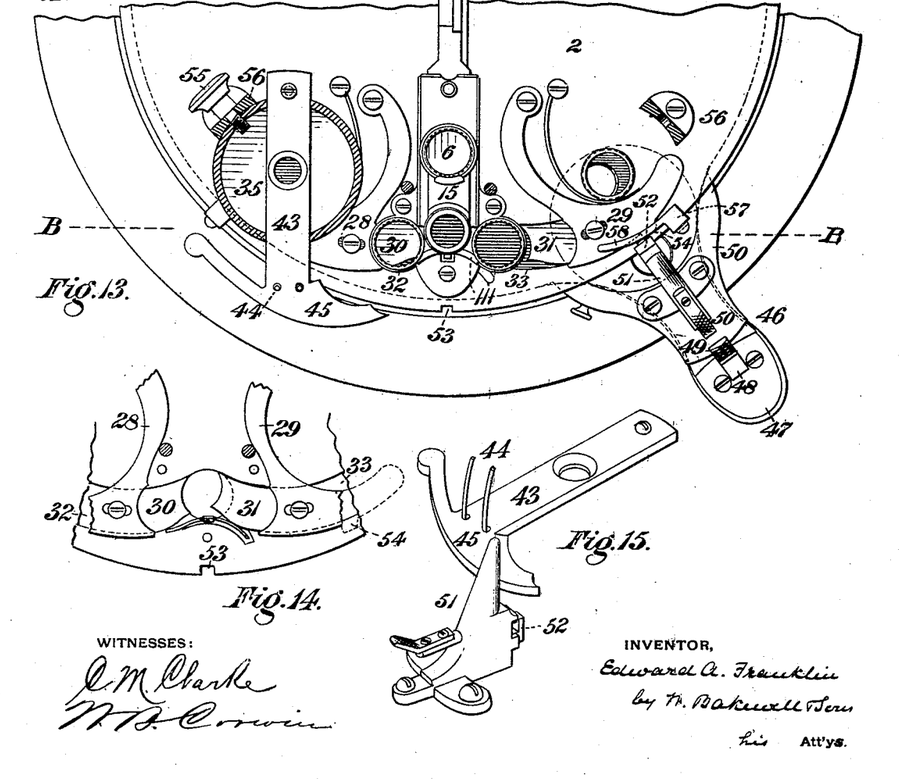
Fig. 13 is a similar view showing the movable plate in a different position.
Fig. 14 is a partial plan view of the stationary plate, showing the wad-pushers.
Fig. 15 is a perspective view of the striker, showing its relation to the slide 43.
Figure 16:
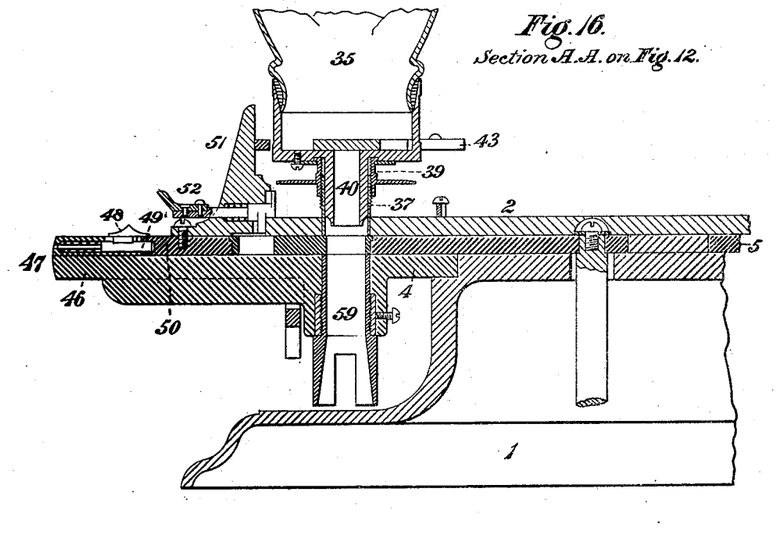
Fig. 16, Sheet 8, is a vertical section on the line A A of Fig. 12.
Figure 17:
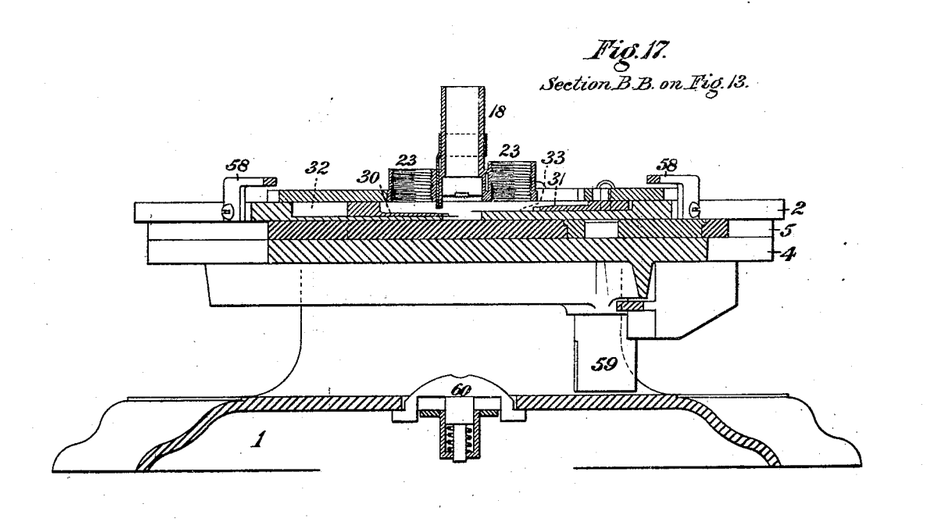
Fig. 17 is a vertical section on the line B B of Fig. 13.

Each hopper is provided with a weight, 26, which bears upon the column of wads in the hopper and supplies the necessary pressure to cause them to feed properly through the tube 21. A wire, 27, is soldered across the top of the hopper for the purpose of hanging up the weight 26 when it is not needed. The wad-slides of the said hoppers are operated by spring-dogs 28 and 29, Sheet 7, which are pivoted on the surface of the bed-plate at the opposite sides of the wad-hoppers. The slides 30 and 31, which are operated by these dogs 28 and 29, move in recesses or grooves 32 33, (see Figs. 13 and 17,) which grooves lead into the opening directly under the plunger 9. The groove 32 is deep, while the groove 33 is shallow, so that a wad fed in by the slide 31 would be placed under the plunger over or on top of the wad fed in by the slide 30. The slide 15, operating on the surface of the plate, is at a still higher plane, so that a wad fed in by it from the hopper 6 would be fed on top of a wad fed in by the slide 31. In practice, however, these wads are fed in separately; but by this arrangement they do not interfere with each other, and it is possible to superpose a wad from the hopper 6 over one from each of the other hoppers and a wad from the hopper 8 over a wad from the hopper 7. The slides are detachable, so that others of various thicknesses to suit wads of different thicknesses may be interchanged therefor, if desired.

Figure 18:
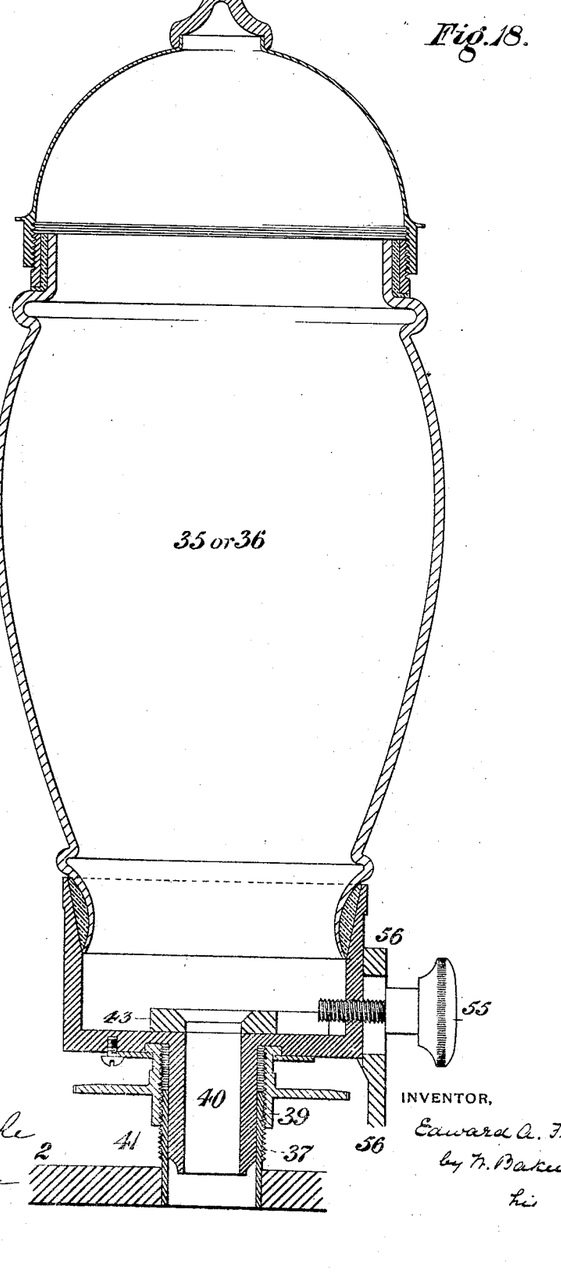
Fig. 18, Sheet 9, is a vertical section of the shot or powder hopper.

The powder and shot hoppers are shown at 35 and 36. (See Figs. 1 and 18.) They are secured to externally-threaded tubes 37 on the bed-plate 2. These tubes constitute the lower members of the powder and shot chargers. The hoppers are secured to them by means of a revoluble screw-collar, 39, attached to the base of the hoppers around the downwardly-extending tube 40, which constitutes the other member of the chargers. (See Fig. 18.) The chargers are numbered 41 and 42, and their capacity can be changed at will by screwing the hopper up or down by turning the screw-collar 39. When the hopper is screwed up, the tube 40 is drawn up in the tube 37, and this increases the capacity of the charger, and when the hopper is screwed down the tube 40 is lowered in the tube 37, and this decreases the capacity of the charger. The charger is cut off from the interior of the hopper by means of the slide 43 in the bottom of the hopper, which is held normally open by means of a spring, 44, Sheet 7, and is closed by the operation of an incline or curved arm, 45, attached to its outer end. Projecting from opposite sides of the revoluble plate 4 are arms 46, each having a thickened end, 47, projecting above the surface of the plate and forming a shoulder, in which end is a spring-pawl, 48, Sheets 4 and 7. This pawl engages a hole or notch, 49, in the end of the projection 50 from the plate 5, for the purpose of securing the plate 5 to the plate 4 and causing it to move therewith, it being understood that there is a projection, 50, for each arm 46. On the surface of the projection 50 is a vertical arm or striker, 51, in which is a spring-pawl, 52, provided for the purpose of engaging a notch, 53, in the front edge of the bed-plate 2 to secure the revoluble plates 4 and 5 in a fixed position with reference to the plunger 9. This pawl 52 has the further function of engaging a tooth, 54, Figs. 12 and 13, on the outer edges of the spring-dogs 28 and 29, which operate the slides 30 and 31. The striker 51 engages the curved arms 45 in the outer ends of the slides 43 in the bottom of the hoppers 35 and 36, for the purpose of operating the same to close the lower ends when the charge of powder or shot in the chargers is discharged into the cartridge-shell. The hoppers 35 and 36 are secured in their adjusted positions, Figs. 3 and 8, by means of set-screws 55, working through slots in the vertical brackets 56, which are secured to the top of the bed-plate 2. The set-screw enters a suitable hole in the side of the hopper, and is screwed up until its shoulder clamps the bracket firmly against the side of the hopper. Secured to the edge of the bed-plate at a proper position with reference to the charger 41 or 42 is a stop, 57, which has an inwardly-projecting curved arm, 58. When the plate 5 is swung around to either side to retract one of the spring-dogs, 28 or 29, which dog is engaged in such movement by the pawl 52 encountering the tooth 54, the dog is carried back until the wad-slide, which is operated thereby, is drawn clear of the lower end of the wad-hopper and permits the wad to drop, and at this instant the curved arm 58 engages the pawl 52 and forces it back out of engagement with the tooth 54 and releases the spring-dog, so that the latter springs forward and forces the wad, which has fallen down in front of the slide, into position under the plunger 9. Attached to the under side of the revoluble plate 4, at the inner end of each projecting arm 46, is a cartridge-shell holder, 59, Sheets 4 and 8, which is of tubular form and sufficient capacity to receive a shell of suitable size. At the upper end of this tubular holder is an opening through the plates 4 5 and the bed-plate 2. This opening is the passage through which the powder, shot, and wads are conducted into the shell. The lower ends of the shell-holders 59 are slotted on opposite sides, and in the stand 1, directly under the plunger 9, is a spring guide or incline, 60, which, being in the path of the lower end of the shell when the latter is brought around into position under the plunger 9 by the revolution of the plate 4, causes the shell to be raised in the holder until its upper end comes into proper position under the plunger.

In the operation of loading the shell the revoluble plates are moved first to the left, so that the powder may be fed into the shell, then to the center to receive a wad or wads, then to the right to receive the charge of shot, and then to the middle to receive the final wad. These movements of the plates 4 and 5 are of course attended with similar movements at the rear side of the machine, and I utilize these movements for the purpose of automatically feeding an empty shell into the shell-holder at the rear of the machine. I will now proceed to describe the mechanism by which this is accomplished.

Figure 5:
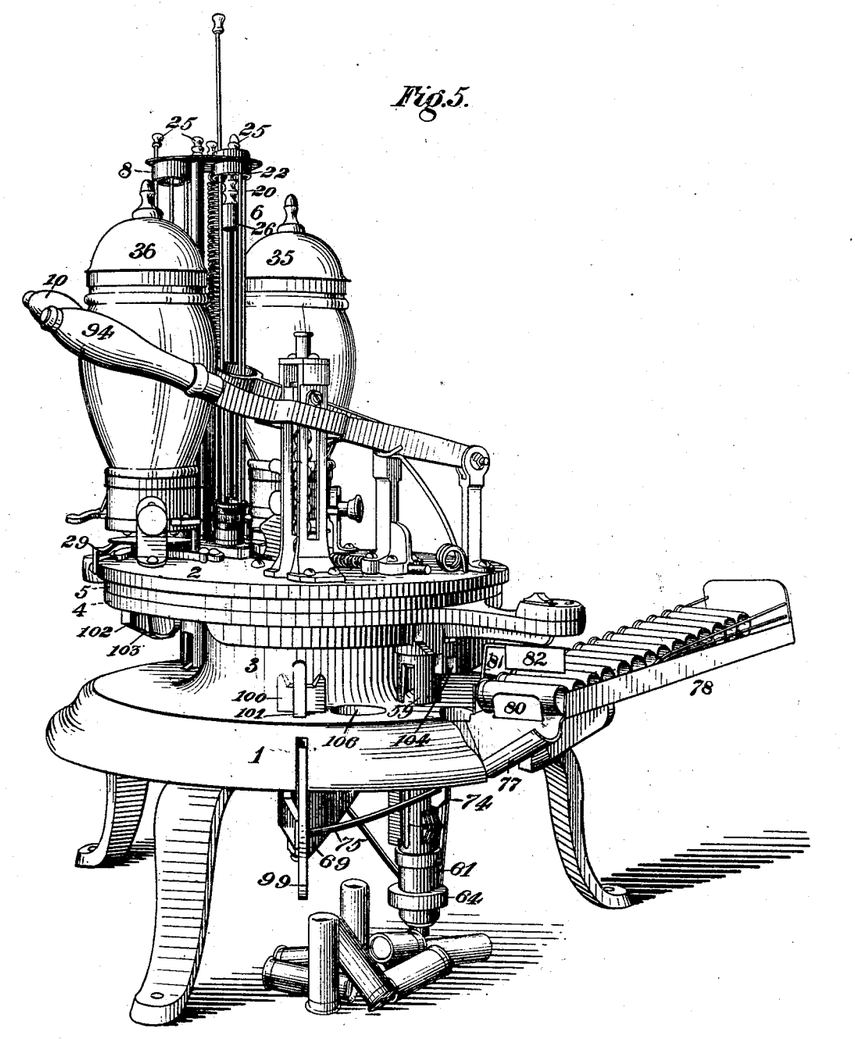
Fig. 5, Sheet 5, is a perspective view of the machine.
Figure 19:
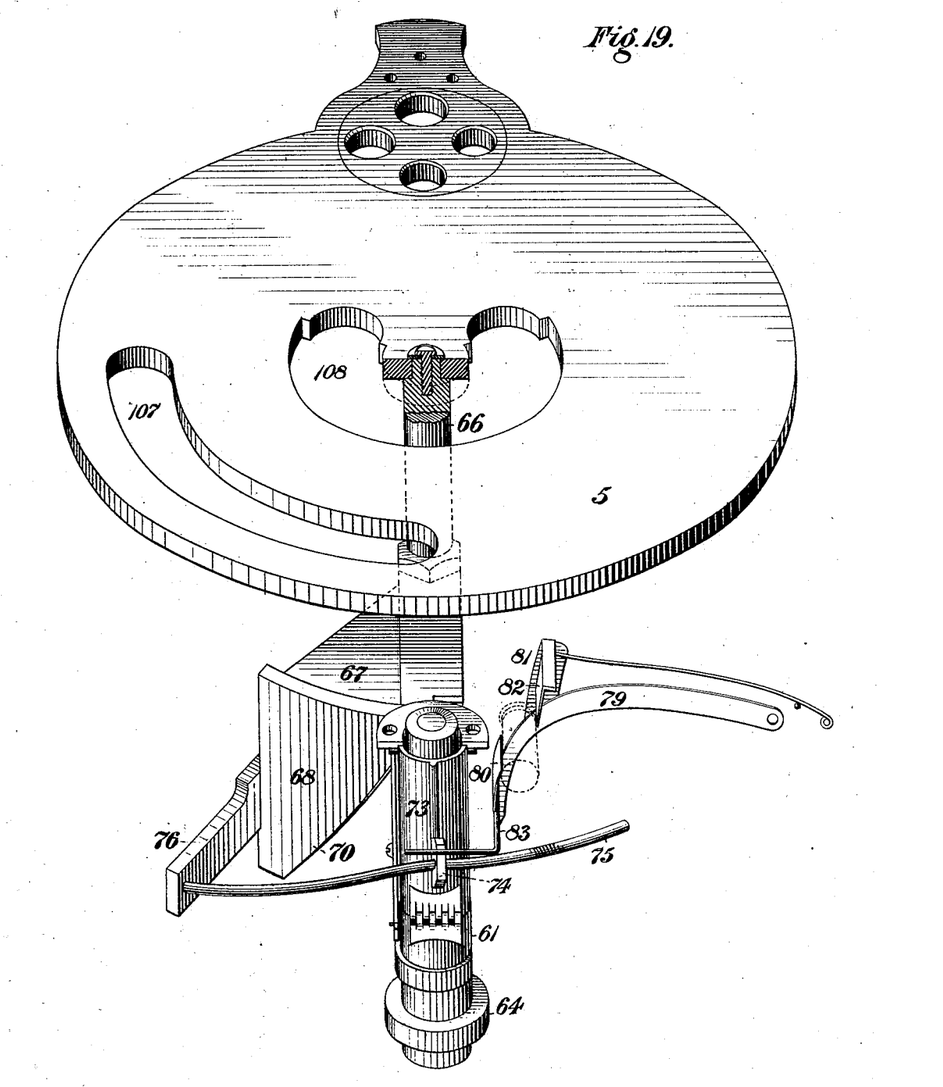
Fig. 19, Sheet 10, is a perspective view of the movable plate 5, showing the shell-feeding mechanism.
Figures 20, 21:
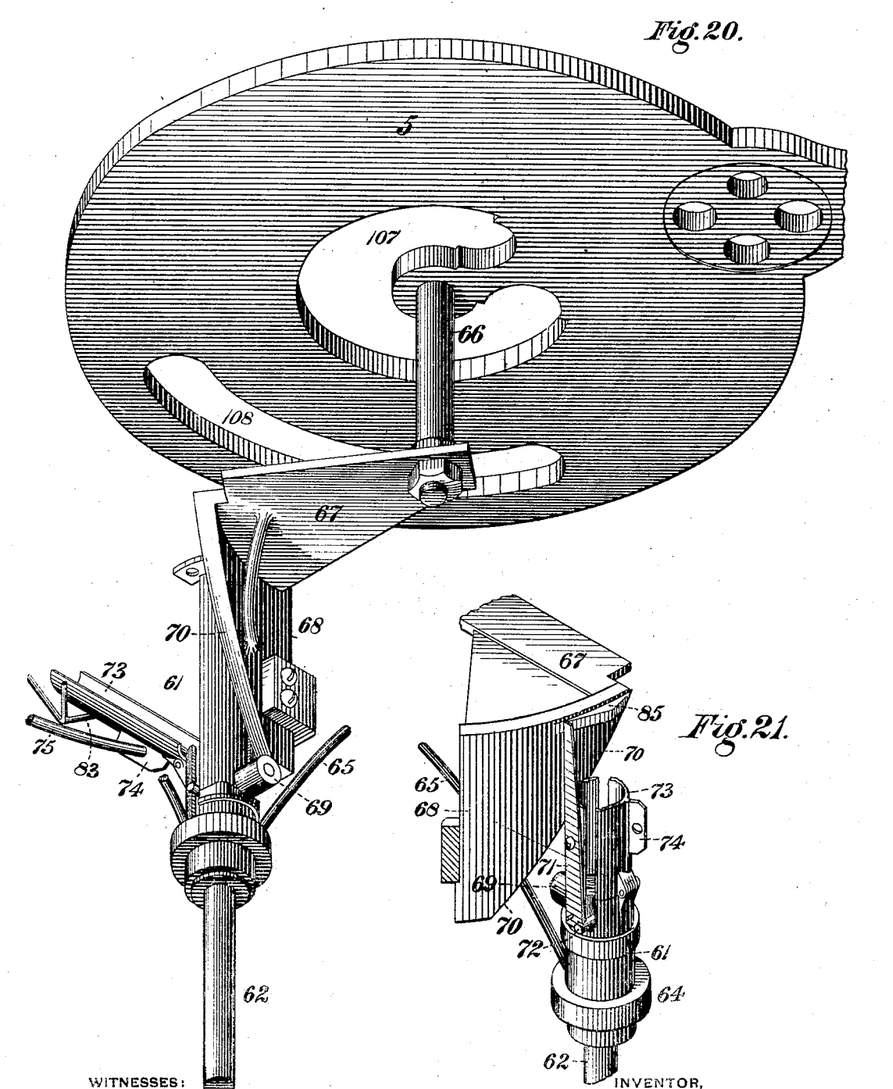
Fig. 20, Sheet 11, is a similar view showing the shell-receiving mechanism in position for receiving a shell.
Fig. 21 is a perspective view showing the mechanism for operating the plunger of the shell-holder.
Figure 23:
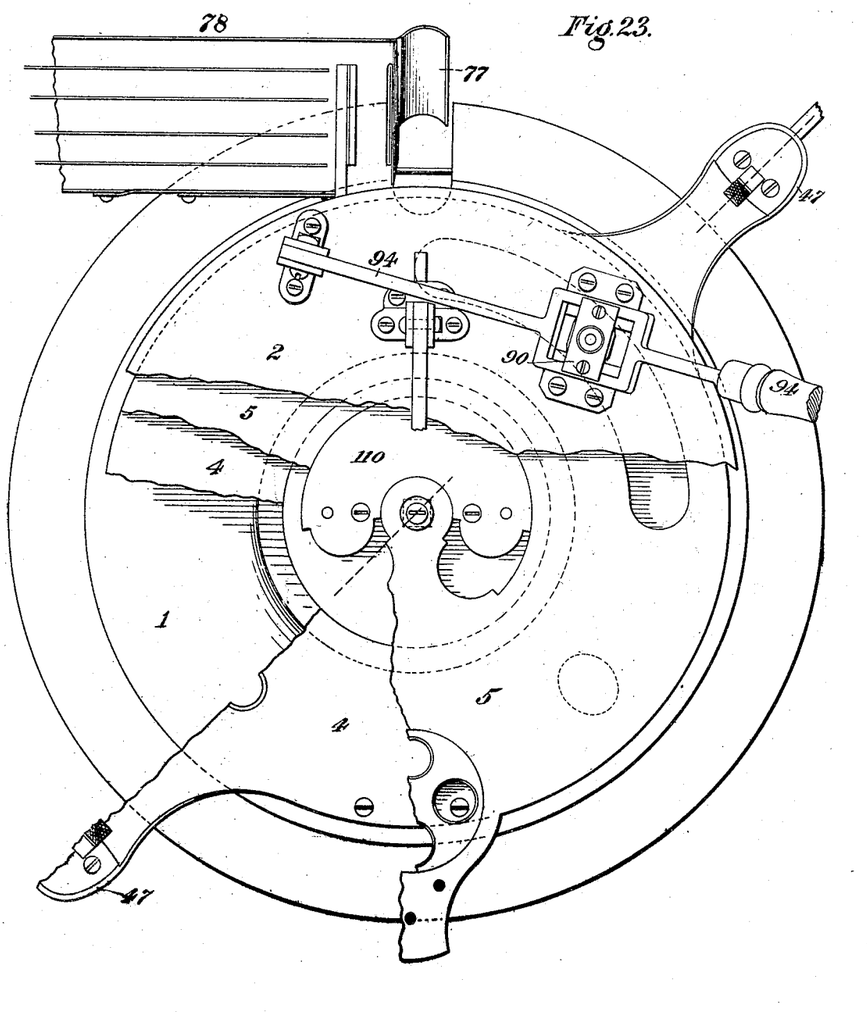
Fig. 23, Sheet 13, is a plan view, partly broken away, showing the various plates.
Figures 24, 25, 26:
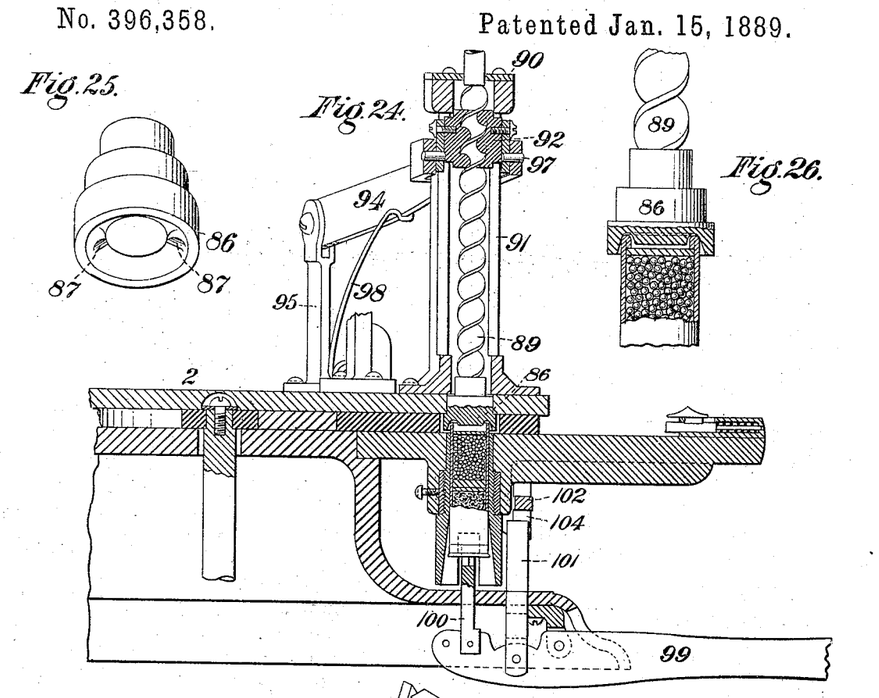
Fig. 24, Sheet 14, is a vertical longitudinal section through the crimping device.
Fig. 25 is a perspective view of the bottom of the spiral stem of the crimper.
Fig. 26 is a view of the spiral stem, showing the shell in position to be crimped.
Figures 27, 28:
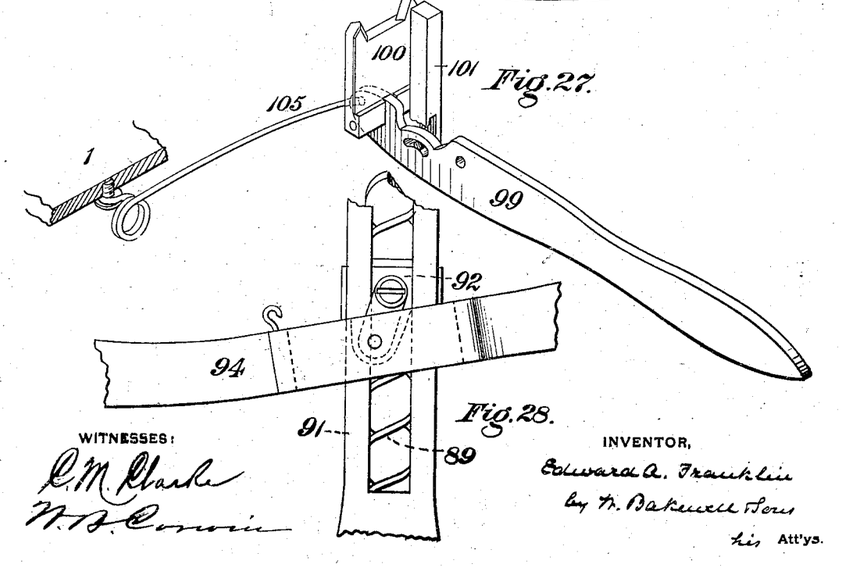
Fig. 27 is a perspective view of the device for holding the shell up against the crimper.
Fig. 28 is a view of the lever for operating the spiral stem of the crimper.

At the rear side of the machine is a tubular guide, 61, Figs. 1, 4, 10, and 11, in which is placed a plunger, 62, held normally in a raised position by a spiral spring, 63, mounted thereon and bearing against a suitable shoulder in the guide. The guide is braced by means of a collar, 64, and diagonal braces 65, extending down from the stand. The revoluble plate 5 is provided with a central stem or axis, 66, which extends down through the hollow central standard, 3, and at its lower end is provided with a radial arm, 67, on the outer end of which is a downwardly-extending quadrant-shaped piece, 68, Figs. 19 and 20, which is arranged just inside of the tubular guide 61, so that its inclined surface 70 shall engage a projection, 69, on the plunger 62, said projection extending out from the plunger through a slot in the side of the tubular guide, and being fitted with a friction-roller at its outer end, so as to reduce the friction between it and the surface of the incline 70, Fig. 20. The effect of the incline 70 upon the projection 69 is to cause the plunger 62 to be depressed in the tubular guide 61 as the plate 5 is moved around to bring the cartridge-shell under the shot-hopper. When this occurs, the limit of the downward movement of the plunger 62 is reached, and it is caught and held in this position by a spring-stop, 71, pivoted at the side of the tubular guide 61, which engages a pin, 72, projecting from the side of the plunger through a slot in the side of the guide 61. (See Fig. 21.) The rear side of the upper portion of the tubular guide is divided into two parts. The upper part, 73, is hinged to the lower part, and is provided with a perforated lug, 74, through which a bent rod, 75, attached to an arm, 76, extending from the quadrant 68, passes, Figs. 3 and 19. This rod 75 is throughout the outer portion of its length concentric with the movement of the plate 5, so that it shall have no effect upon the tubular guide while such portion is passing through the lug 74; but the inner part of its length is eccentric, being bent so as to open the hinged part 73 and throw it down into an inclined position in line with the lower end of an inclined chute, 77, at the end of the shell-hopper 78, Figs. 5 and 23. At the side of the shell-hopper is a spring-actuated arm, 79, Figs. 5 and 19, having at its outer end a stop, 80, which, when it is in its upward position, projects up through a slot in the bottom of the shell-hopper and prevents the shells from rolling into the chute 77. Secured also to the arm 79 by a bent arm, 81, is a stop, 82, which extends over the top of the shell-hopper a distance equal to the diameter of one shell back of the stop 80, and this stop 82 is brought into action when the spring-arm 79 is in its lowest position, its function being to prevent more than one shell rolling into the chute 77 at a time. The spring-arm 79 is operated by a pin, 83, extending from its forward end under the hinged part 73, so that when the latter is brought down into position under the chute 77 to receive a shell the stop 80 is depressed and permits the first shell to roll from the hopper 78 into the chute 77, and at the same time the stop 82 comes down into position in front of the other shells which are contained in the hopper, and thereby prevents them from passing into the chute. The floor of the hopper 78 is formed of wires grooved or provided with a raised track, so that the bead of the cap of the shell shall not come in contact with the floor and prevent the proper feeding of the row of shells contained in the hopper. When the shell is thus fed into the chute 77, it slides down the hinged part 73 into position over the plunger 62, which, as before stated, is locked in its position. The movement of the circular plates 4 5 in carrying the shell-holder at the front side of the machine from under the shot-charger back to position under the plunger in order to receive the final wad brings the other shell-holder into position directly over a hole, 84, in the stand-plate at the rear of the machine at the upper end of the tubular guide 61, and also, by the retractile movement of the quadrant 68, causes the rod 75 to close the hinged part 73 of the tubular guide 61. On the surface of the quadrant 68 is an incline, 85, Fig. 21, which, as the quadrant moves back, comes in contact with the upper end of the spring-stop 71 and throws it forward, so that its lower end is disengaged from the pin 72. This releases the plunger, which then springs upward, throwing the shell up into the shell-holder, which stands directly above it. The plunger, remaining in this position, supports the shell in the holder until, by the turning of the plate 4, it is moved off the end of the plunger onto the top surface of the stand, on which it is carried around to the front of the machine into position under the plunger 9. The shell-hopper 78 is a shallow trough secured in an inclined position to the rear side of the stand of the machine by a suitable bracket. It is opened at the top, so as to be easily filled with shells as needed. Its sides may be made as high as desired for the purpose of containing several layers of shells, with a suitable slot in the lower end to permit the lower row to pass out freely to the stops 80 and 82.

After the shell has been filled, its upper edge needs to be turned in onto the top wad. This operation is called "crimping," and is performed in my machine by the following devices, (Sheets 13 and 14:) When the wad has been placed on top of the shot and the plates are in the position shown in Fig. 4, the pawl 48 is drawn back to release the plate 4 from the plate 5, and the plate 4 is then moved around into position, carrying the loaded shell under the crimping devices.

The crimping devices consist of a rotating head, 86, having a concave under face with slight projections 87 arranged concentrically inside of the rim a sufficient distance to engage the inner edge of the open end of the shell. This head is mounted in a suitable opening in the bed-plate 2. It is provided with a spirally-twisted stem, 89, which is journaled in the top plate, 90, of a vertical frame or stand, 91, bolted to the bed of the machine. Mounted on the spiral stem 89 is a nut, 92, which moves in guides formed in the sides of the frame 91, and is operated by a lever, 94, pivoted to a standard, 95, the nut being pivotally connected to the lever by pins 97, extending from the sides of the nut to the lever beyond the outer faces of the guides, the lever being provided with a rectangular opening, through which the frame 91 projects. (See Fig. 23.) The lever is sustained and its retractile movement is made easy by a strong spring, 98, fastened to the bed-plate 2 and bearing upward against the under side of the lever between the standard 95 and frame 91.

Pivoted to the stand of the machine below the crimper is a lever, 99. Pivoted to the end of the lever 99 is a short pitman, 100, which works up through a hole in the stand of the machine below the crimper-head and in the path of the shell-holder. This pitman is made narrow, so as to pass through the slots in the side of the shell-holder 59, and it has a recessed upper end with inclined edges, so as to center the shell properly under the crimper. Also pivoted to the lever 99, outside of the pitman 100, is a pin, 101, which works up through a hole in the stand of the machine directly in the path of a concentric plate, 102, Fig. 3, secured to the under side of the revoluble plate 4. The plate 102 has an inclined surface or edge, 103, which, acting on the end of the pin 101, depresses the pitman 100, forcing it down through the stand of the machine out of the way of the cartridge. The pin 101 is directly opposite the recessed center of the pitman 100, and the plate 102 is provided with a notch, 104, which is directly opposite the center of the shell-holder 59, so that when in the movement of the plate 4 the shell-holder comes under the crimper and over the pitman 100 the pin 101 shall enter the notch 104 and secure the cartridge in proper position under the crimper to be acted on thereby, the pin 101 being actuated vertically by a spring, 105, fastened to the under side of the stand and bearing on the end of the lever 99. When the parts are in the position just described, the operator forces the cartridge firmly up against the crimper 86 by means of the lever 99, and at the same time depresses the lever 94, so as to rotate the crimper against the open end of the cartridge-shell, which rotation causes the projections 87 to turn the edges of the shell in upon the top of the wad and properly crimp it.

The crimper 86 is removable, so that interchangeable heads may be put in to suit different sizes of cartridges. The head is easily removable by holding it with the finger inserted from below while the lever 94 is being raised, which will cause the head to become unscrewed by reason of the fact that it is fastened to its stem by a left-hand thread, and if held when the lever is retracted the stem will unscrew therefrom. After the crimping operation has been completed, the pitman 100 is depressed by raising the lever 99, and then the revolution of the plate 4 is continued until the shell-holder comes over a large hole, 106, in the frame of the machine, when the cartridge, not being supported, will drop out of the hole through the opening 106 into a proper receptacle.

In the plate 5 are two slots or openings, 107 and 108, the purpose of which is to permit the movement of the plate in bringing the cartridge-shell from the powder to the shot hopper without interfering with the crimper, which passes through the slot 107, while within the slot 108 is the stop 110, which limits the movement of the plate 5 to the left under the powder-hopper and to the right under the shot-hopper.

In front of the wad-slides 30, 31, and 15 is a curved spring, 111, (see Fig. 13,) which, when the wads are pushed into position under the plunger 9, holds the wads in position until they are carried down by the plunger. In Fig. 10 is shown a ring, 112, and cap-piece 113, united to each other, which ring fits around the base of the wad-hopper 6, while the cap-piece covers the wad-guide 17 between the hopper 6 and the plunger 9. By raising the ring the cap-piece is also raised, so as to allow the passage of a thicker wad. On the lower face of the cap-piece 113 is a serrated spring, 114, the purpose of which is to prevent the wad from being retracted by the slide 15 after the wad has been delivered in the path of the plunger 9. (See Figs. 10 and 4.)

Figure 22:
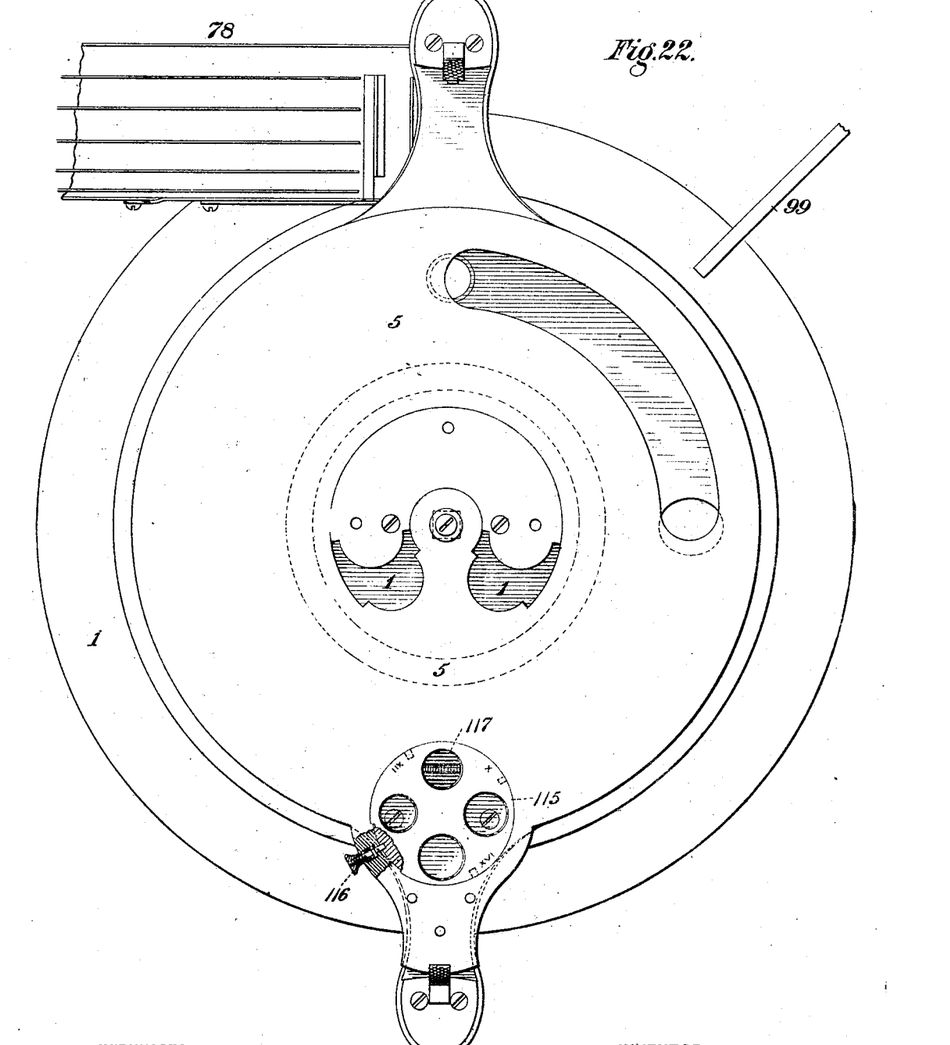
Fig. 22, Sheet 12, is a plan view of the machine with the plate 2 removed.

In order to adjust the machine to load shells of different gage, the shell-holders 59 are removably secured to the plate 4 by a suitable screw-thread, as shown in Fig. 4, so that holders for No. 12 gage shells may be removed and holders for Nos. 10, 14, or other gage substituted therefor. At the same time it is necessary to change the size of the opening in the plate 5 under the plunger 9, through which the charge passes to the shell. This is done by means of a revoluble plate, 115, which is set in the plate 5 so as to turn therein, and is secured by a spring-bolt, 116. (See Fig. 22.) This plate 15 is provided with annular openings 117, of different gages, which by turning the plate may be brought over the cartridge-holder. These openings are slightly smaller than the gage of the shell to be loaded, so as to prevent injury to the shell. Should it be desirable to place more than one wad over the powder or shot, it may be done by means of the lever 10 and slide 15 by raising and lowering the lever a second time after the first wad has been driven down on the powder.

What I claim as my invention, and desire to secure by Letters Patent, is—

1. The combination, in a machine for loading cartridges, of a stationary bed-plate mounted on a stand and an oscillating plate, 5, beneath it, with a revoluble plate arranged beneath the oscillating plate and carrying a pair of shell-holders at opposite sides, powder, shot, and wad chargers, together with a plunger for charging the cartridges, mounted on the bed-plate, and a feeding device comprising a shell-hopper, chute, and guide having a plunger, all arranged in conjunction with and operated from the movable plates for charging the empty shells into the holders, substantially as and for the purposes described.

2. A wad-hopper consisting of an open frame formed of vertical wires, one of which is removable for the purpose of charging the hopper through its sides, substantially as and for the purposes described.

3. A wad-hopper having a threaded lower end, whereby it may be adjustably attached to a threaded socket, and a lock-nut whereby its adjusted position may be fixed, substantially as and for the purposes described.

4. In a cartridge-loading machine, a bed-plate, combined with a hopper for supplying ammunition and having a charging-chamber at its base composed of an externally-threaded tube fast on said bed-plate, a tube extending from the hopper into the first-named tube, and a screw-collar swiveled to the hopper and engaging the externally-threaded tube and rotatable to raise and lower the hopper, and thereby vary the capacity of the charger, substantially as and for the purposes described.

5. In a cartridge-loading machine, a bed-plate, combined with a hopper for supplying ammunition and having a charging-chamber at its base composed of an externally-threaded tube fast on said bed-plate, a tube extending from the hopper into the first-named tube, and a screw-collar swiveled to the hopper and engaging the externally-threaded tube and rotatable to raise and lower the hopper, and thereby vary the capacity of the charger, and a bracket rising from the bed-plate and provided with a set-screw tapped into the hopper and adapted to bind the hopper to the bracket, substantially as and for the purposes described.

6. The combination of a stationary bed-plate, a charging-plunger, wad-hoppers arranged on opposite sides of the plunger, wad-slides operated by spring-dogs for feeding the wads into the path of the plunger, an oscillating striker having a spring-pawl for engaging and retracting the slides, so as to permit the feed of the wads, and a tripping device for tripping the pawl to permit the release of the spring-dog, substantially as and for the purposes described.

7. The combination of a revoluble plate carrying the shell-holders with a spring-actuated incline arranged below the plunger for raising the shell in the holder into proper position with relation to the range of the plunger, substantially as and for the purposes described.

8. In a cartridge-loading machine, the stationary bed-plate, in combination with the revoluble plate and the shell-holders depending therefrom, a partly-revoluble plate interposed between the bed-plate and the revoluble plate, cartridge charging or loading devices fixed to the bed-plate, slides for such devices arranged in the bed-plate and adapted to be moved to open and close the loading devices, and arms projecting from the revoluble plate and carrying pawls to operate such slides, and also to connect and release the two plates, substantially as and for the purposes described.

9. The combination of the oscillating or partially-revolving plate with a tubular guide attached to the bed-plate and provided with a hinged side, which, when opened, acts to receive the empty shells, a plunger operating inside of the guide, an incline operated by a radial arm from said plate for actuating said plunger, and a bent rod for opening and closing the hinged side, substantially as and for the purposes described.

10. The combination of the tubular guide for receiving the empty cartridge, a spring-plunger arranged in said guide and operated by an oscillating incline to depress the plunger, a spring-stop for maintaining the plunger in a depressed position, and a wedge on said oscillating incline for tripping the stop and releasing the plunger, substantially as and for the purposes described.

11. The combination of the shell-holder with a tubular guide and a spring-plunger for feeding the empty shell into the holder, substantially as and for the purposes described.

12. The combination of the shell-hopper having a chute at its lower end, one part of which is movable, with a pivoted stop for closing the end of the hopper when the hinge of the chute is closed, a stop placed back of the end of the hopper the distance of one shell, and a pin arranged in the path of the hinged part of the chute, so as to trip the end stop when the hinged part is open and close the second stop, substantially as and for the purposes described.

13. The combination of the revoluble shell-holder with a crimping device arranged on the bed-plate and a recessed pitman for raising the cartridge up to and centering it beneath the crimper, substantially as and for the purposes described.

14. The combination of a cartridge-loading device and a feed-hopper for feeding the shells, said hopper having a track or way elevated above the bottom of the hopper to free the rims or flanges of the shells from contact with the hopper's bottom and thus insure their proper descent, substantially as and for the purposes described.

15. The combination of a bed-plate, a detachable shell-holder, and a revoluble plate in the bed-plate, and provided with circular feed-openings of different gages, so as to enable the holder to be changed for different-gage shells, substantially as and for the purposes described.

In testimony whereof I have hereunto set my hand this 9th day of April, A. D. 1887.

EDWARD A. FRANKLIN.

Witnesses:
W. B. CORWIN,
JNO. K. SMITH.